United States Patent [19]

Carroll et al.

[11] 3,819,864

[45] June 25, 1974

[54] DIGITAL DC OFFSET REMOVAL METHOD FOR DATA SYSTEMS

[75] Inventors: Paul E. Carroll; Ralph A. Harris, both of Houston, Tex.

[73] Assignee: Texas Instruments Incorporated, Dallas, Tex.

[22] Filed: Mar. 30, 1973

[21] Appl. No.: 346,518

[52] U.S. Cl. .......... 179/15 BL
[51] Int. Cl. .......... H04j 3/00
[58] Field of Search ....... 179/15 A, 15 BL; 328/167

[56] References Cited

UNITED STATES PATENTS

| | | | |
|---|---|---|---|
| 3,657,669 | 4/1972 | Proakis | 328/167 |
| 3,676,598 | 7/1972 | Kurth | 179/15 A |
| 3,699,325 | 10/1972 | Montgomery | 179/15 BL |

*Primary Examiner*—Ralph D. Blakeslee
*Attorney, Agent, or Firm*—Harold Levine; Rene Grossman; T. G. Devine

[57] ABSTRACT

This disclosure relates to dc removal in data systems and in particular to multichannel, multiplexed data, gain ranging, seismic data acquisition systems. A medium drift dc amplifier (approximately $\pm 2.5\ \mu v/°C$) replaces the chopper stabilized amplifier. An overrange capability is provided in both the A/D converter and the gain ranging amplifier so the combined drift of the medium drift amplifier and the gain ranging amplifier over the system temperature is less than the overrange. This eliminates the necessity for rezeroing as the temperature changes or from using part of the converter range for dc drift. The digital filter has at least one word of memory per input channel plus one for each gain of the gain ranging amplifier. The input of the gain ranging amplifier is shorted periodically by Switch S and the average dc offset for each gain of the gain ranging amplifier is accumulated by filtering. An average is also accumulated by filtering for each of the data channels while they are in normal operation. Two cascaded one pole filters which share common hardware are used. The first removes the portion of offset due to the gain ranging amplifier and the second removes the dc offset due to the stabilized amplifier and multiplexer.

8 Claims, 2 Drawing Figures

DIGITAL DC OFFSET REMOVAL METHOD FOR DATA SYSTEMS

This invention relates to dc offset removal in data systems and in particular to multichannel, multiplexed data, gain ranging, seismic data acquisition systems.

Present seismic systems in general consist of preamplifiers, filters, chopper stabilized dc amplifiers, a multiplexer, a gain ranging dc amplifier and an analog to digital recorder. These are followed by means for formatting the digitized data and recording it on tape. Each of the dc amplifiers is drift prone and gives rise to a dc error component in its output. As a result, the digital data ultimately recorded on tape is corrupted by the presence of these dc error components. Previous systems have sought to minimize this difficulty through the use of high quality low drift dc amplifiers. The dc amplifiers used in the individual data channels are typically chopper stabilized devices having temperature stabilities of about 1 microvolt per degree centigrade. The use of such dc amplifiers is expensive and results only in minimization of the dc error component in the recorded data.

It is therefore an object of this invention to eliminate the dc offset problem in multichannel, multiplexed data, gain ranging, seismic data acquisition systems.

It is another object to provide for dc offset removal in multichannel, multiplexed data, gain ranging, seismic data acquistion systems.

It is a further object to provide for removal of the DC offset through the addition of a simple digital filter.

It is still a further object to lower the cost of such systems by simplification of the stabilized dc amplifiers made possible by the removal of the dc offset.

Figure 1:
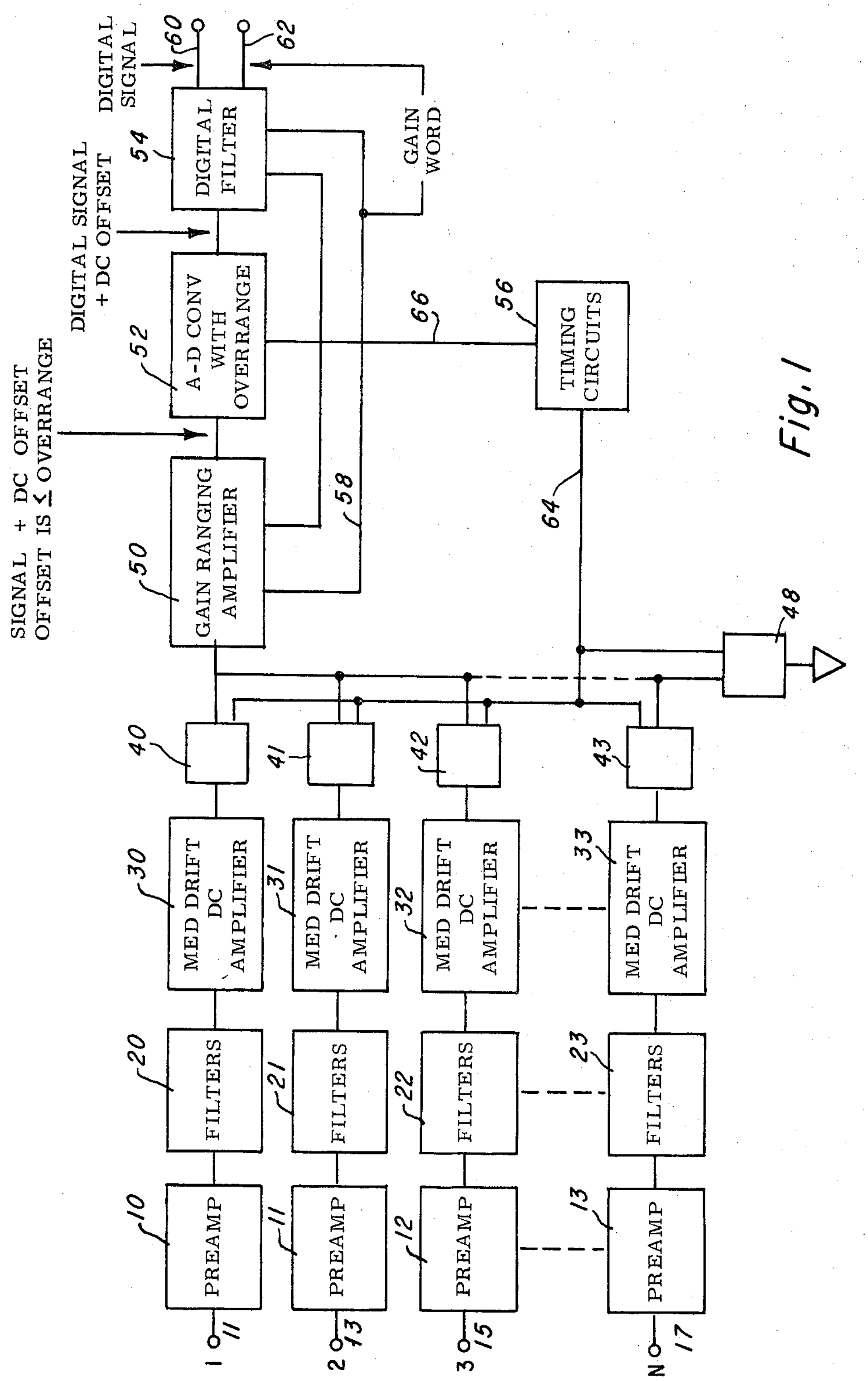
Figure 2:
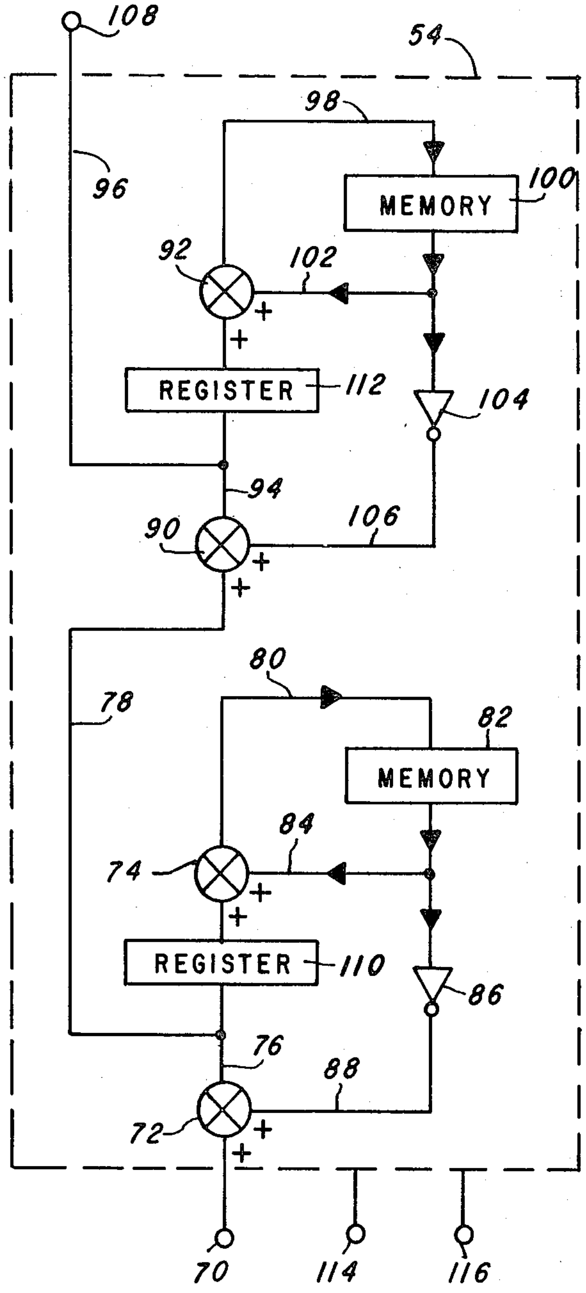

For a more complete understanding of the invention and further objects and advantages thereof, reference may now be had to the following description taken in conjunction with the drawings, wherein FIG. 1 shows a block diagram of the seismic data acquistion system;

FIG. 2 shows a digital filter.

Referring to FIG. 1, the inputs to the acquisition system 11-17 are derived from one or more seismometers. These inputs are applied to individual channel preamplifiers 10–13. On each channel the preamplifier output is connected to a bandpass filter 20–23. The filter outputs in turn are connected to dc amplifiers 30–33. These are relatively low cost medium drift dc amplifiers having a temperature drift of approximately ±2.5 microvolts per degree centigrade. The multichannel data are then time division multiple multiplexed by semiconductor switches 40–43. These switches are closed in accordance with synchronization signals provided by timing circuit 56 through line 64. Each of the elements described to this point is a conventional circuit or device well known in the art. The multiplex data is input to a gain ranging amplifier 50. This amplifier may be a dc amplifier but could also be another type of amplifier. A typical amplifier of this type is that disclosed in U.S. Pat. No. 3,684,968. The gain ranging amplifier has a gain word output which is connected to the digital filter by line 58 and from the digital filter to external formatting circuitry through output 62. The amplifier also has a signal output which is the input to an analog to digital converter 52. Analog to digital converters required for the practice of this invention are also well known in the art. The output of the analog to digital converter 52 is connected to the digital filter 54. The digital filter output is connected to the external formatting circuitry through output 60 and 62. Synchronization signals provided by timing circuit 56 are also connected by means of line 66 to the gain ranging amplifier 50 to the analog to digital converter 52 and to the digital filter 54. Semiconductor switch 48 may be used to connect the input of gain ranging amplifier 50 to ground. This switch is also under the control of timing circuit 56 through line 64.

Individual amplification of the individual channel seismometer outputs is provided by preamplifiers 10–13. Undesirable frequency components are then rejected by filters 20–23. Among other things, these filters provide the necessary feature of anti-alias filtering. The filtered signals are then amplified by means of the dc amplifiers 30–33. Time division multiplexing is accomplished by semiconductor switches 40–43. These switches close sequentially one at a time under control of timing circuits 56. Thus, after one complete cycle of closure each of the data channels will have been sampled once. At the end of each cycle of closure semiconductor switch 48 is closed briefly. Under this condition with its input grounded, the output of gain ranging amplifier 50 will consist only of its dc offset plus noise. This permits updating once each sample period the memory of digital filter 54 which contains the dc offset contributed by gain ranging amplifier 50. The precise sequence of closure for time division multiplexing switches 40–43 is not ciritical.

Further amplification of the multiplexed data is provided by gain ranging amplifier 50. The gain ranging feature ensures that signal applied to the analog to digital converter is within the conversion scale of the analog to digital converter. The amplifier has eight discrete gain levels, each a factor of four greater than the next lower gain setting. In operation, when multiplexer switches 40–43 switch to a new channel the amplifier then monitors the data from the new channel and based on its absolute amplitude and rate of change makes the decision to increase, decrease, or not alter the gain of the amplifier. If the decision is to alter the gain of the amplifier, the gain will be increased or decreased by a factor of four. Note that during this first iteration since the gain has been reset to its lowest value, the gain will be logically inhibited from decreasing. Still, during the same sample period of the same channel this procedure is repeated seven more times. As a result of the fact that the gain of the amplifier can be changed as many as eight times any of the allowable gain settings of the amplifier can be reached. At the end of this period of gain adjustment the output signal is input to the analog to digital converter to be digitized and ultimately to be output to the formatting circuit. Similarly, the gain word indicative of the final gain setting of amplifier 50 is output to the formatting circuit through output 62. The output to the formatting circuit is in effect expressed in terms of exponential notation. That is, the output is expressed in the form $A \times 4^b$. Where A is the digitized signal amplitude at output 60 and $b$ is the power appearing at output 62. The multiplexer switches 40–43 next switch to a new channel and the process of gain adjustment is repeated.

This embodiment of the gain ranging amplifier 50 is for purposes of illustration only. Any amplifier which adjusts its gain to ensure that its output signal is compatible with the conversion range of the following analog to digital converter can be used in the practice of this invention. Specific details such as the number of gain settings, the ratio between adjacent gain settings, and the method of setting the gain are unimportant and can be varied.

In systems employing high quality dc amplifiers 30–33, the dc offset level in the output of amplifier 50 will be small and the input range of A/D converter 52 need only be large enough to accommodate the largest contemplated signal, although a part of the A/D converter range will be used by the offset. In the present invention, however, dc amplifiers 30–33 have more significant dc offset and as a result the output of gain ranging amplifier 50 will include both signal and a substantial dc offset component. It is necessary therefore to provide the A/D converter with sufficient overrange to accommodate this dc offset component. The digitized signal from the A/D converter is representative of the signal plus the dc offset. Digital filter 54 serves to remove the dc offset portion of this digitized signal.

FIG. 2 shows the digital filter 54 in diagrammatic form. The filter has an input 70 from the analog to digital converter 52 and input 114 which receives the gain word from gain ranging amplifier 50 and an input 116 from timing circuit 56. The digitized signal is connected to adder 72. The output of the adder is connected through line 76 to register 110. The output of the register forms the input to adder 74. The output of the adder is connected by line 80 to memory 82. The output of this memory is connected by line 84 back to adder 74 and also to inverter 86 and line 88 back to adder 72. The output of adder 72 is also connected by line 76 and 78 to adder 90 whose output on line 94 forms the input of register 112. Register 112 in turn provides an input to adder 92 whose output is connected by line 98 to memory 100. The output of memory 100 is fed by line 102 to adder 92 and through inverter 104 and line 106 to adder 90. The output of adder 90 is also connected by line 96 to output 108 which is an input to the external formatting circuit.

In operation, memory 82 contains current estimates of the dc offset of gain ranging amplifier 50 for each of its gain settings. Similarly, memory 100 contains current estimates of the dc offset contributed by medium drift dc amplifiers 30–33. A digitized signal representing the data amplitude on a particular channel plus the dc offsets contributed by the several amplifiers appears on input 70 and represents one input to adder 72. At the same time the memory 82 under the control of gain word input 114 selects the dc offset of gain ranging amplifier 50 for the gain setting which was used in obtaining this data sample. This estimate is inverted by inverter 86 and summed with the signal plus dc offset by adder 72. The output of adder 72 therefore no longer contains the dc offset contributed by the gain ranging amplifier 50. This modified sample then becomes an input to adder 90. Similarly, memory 100 under the control of timing signal input 116 selects the current estimate of dc offset for the medium drift dc amplifier which was used in recording this data sample. This dc offset estimate is inverted by inverter 104 and added by adder 90 to the previously modified signal sample. As a result, the output of adder 90 no longer contains the dc offset contributed by the medium drift dc amplifier. Thus, to the extent that the current estimates of dc offset in memories 82 and 100 are accurate reflections of the true offsets, the digitized signal at this point will be representative only of true signal. This signal then becomes the output to the formatting circuits appearing at output 108.

In operation, it is necessary to periodically update the data in memories 82 and 100 so as to ensure that these data represent good current estimates of the dc offsets. With regard to memory 82 which contains data representatives of the dc offset introduced by gain ranging amplifier 50, it will be recalled from the discussion above that at the end of each closure cycle of time division multiplexer switches 40–43, semiconductor switch 48 is closed for a brief period. Assume that at this time the gain of amplifier 50 is set at its lowest value. Since the input to the amplifier is now grounded its output will be representative of the dc offset for this lowest gain setting and noise. This signal is digitized by the analog to digital converter 52 and appears at input 70 of digital filter 54. This signal will be represented by $S_n$. The data in memory 82 representing the last estimate of dc offset for the low gain setting of amplifier 50 will be represented by $A_{n-1}$. The output of adder 72 then is the quantity $S_n - A_{n-1}$. It is representative of noise and any change in the dc offset of the low gain channel which has occurred since the last update of this channel in memory 82. If any such change has occurred, it is necessary to update the estimate for this channel in memory 82. Any such update based on the signal at the output of adder 72 however will not be perfect as a result of the contaminating presence of noise. The quantity $S_n - A_{n-1}$ is shifted to the right by a given number of bits in register 110. This shifted version is then added to the latest estimate of dc offset for the low gain channel $A_{n-1}$ by adder 74. The effect of shifting to the right in register 110 is to divide the quantity $S_n - A_{n-1}$ by a number corresponding to the number of bits of shift. The output of adder 74 $A_n$ is given by the expression $$A_n = S_n - A_{n-1}/\mathrm{TC} + A_{n-1}$$

The number TC is representative of the number of bits of shift in register 110. If the signal is shifted to the right by 3 bits, for example, TC is equal to 8. The new estimate $A_n$ of the dc offset for the low gain setting is seen to be equal to the old estimate $A_{n-1}$ plus a correction term. The correction term is the current data value minus the old estimate divided by the quantity TC. It will be recognized by one skilled in the art that this process for obtaining the estimate of dc offset $A_n$ is, in effect, the filtering of the data samples $S_n$ with a low pass filter. Increasing the value of TC has the effect of reducing the bandwidth of this low pass filter. This is desirable since it minimizes the effect of any contaminating noise in $S_n$ on the estimate of dc offset. There is, however, a corresponding reduction in the ability of the estimate to faithfully track true changes in the dc offset of the low gain setting. Choice of the appropriate TC therefore represents a compromise between these conflicting interests, and an effort for hardware simplification.

After this update of memory 82 for the low gain channel, the time division multiplexer switches 40–43 will perform another cycle through the individual channels and the resulting samples appearing at input 70 of digital filter 54 will be processed in the routine manner. At the conclusion of this cycle, semiconductor switch 48 will again ground the input of gain ranging dc amplifier 50. At this time, the gain of amplifier 50 will be established at its second lowest value and the data of memory 82 corresponding to the dc offset of this gain setting will be updated in the manner described above. This process continues for each of the other gain settings of amplifier 50. Thus, the gain word of memory 82 corresponding to any particular gain setting of amplifier 50 will be updated once every 8th cycle of the multiplexer switches 40–43.

When actual data samples are received at input 70, to the extent that memory 82 contains accurate estimates of amplifier 50 dc offsets, the output of adder 72 appearing on line 78 will contain the true signal plus noise plus the dc offset introduced by medium dc amplifiers 30–33. The function of the apparatus represented by the upper half of FIG. 2 is to remove the dc offset contributed by these amplifiers. It will be recognized that the configuration of this apparatus is identical to that of the apparatus represented by the lower half of FIG. 2. In this case, however, the data in memory 100 is representative of the latest estimate of dc offsets for each of the medium drift dc amplifiers 30–33. In this case, the data in memory 100 representing the dc offset of any particular amplifier will be updated each time a data sample from that amplifier appears on line 78. Selection of the appropriate data from memory 100 is under control of the timing signal appearing on input 116.

There has been disclosed herein a method for removing dc offset from the digitized signal in a digital data acquisition system. This capability makes possible the use of low cost medium drift dc amplifiers in the system. While one embodiment has been disclosed, the specific details of this embodiment are not critical to practice of the invention. This is particularly true as regards gain ranging amplifier 50 and digital filter 54. Various approaches and degrees of sophistication can be used with these elements. What is important is the fact that the estimates of dc offset stored in the memory of the filter are indicative of the dc offsets generated by the system in its various configurations. Each of these estimates is updated by averaging samples of the offset obtained when the system is in the corresponding configuration. The appropriate estimate is read from memory and subtracted from the data to remove the dc offset.

What is claimed is:

1. A data acquisition system having a plurality of input channels for supplying input data in the form of analog signals, comprising:

a. first amplifying means for receiving and amplifying the input signals and having an output;

b. second amplifying means having an input;

c. switching means, connected to the output of the first amplifying means and to the input of the second amplifying means, and to a reference voltage for selectively permitting the output of the first amplifier means or the reference voltage to be presented to the input of the second amplifying means, the reference voltage being selected to provide an output signal from the second amplifying means representative of the DC offset of the second amplifying means;

d. analog-to-digital conversion means, connected to receive the output of the second amplifying means for conversion into digital form; and e. comparison means, for comparing a digital signal from the analog-to-digital conversion means, representative of the DC offset with a digital signal representative of input data and DC offset, the difference being supplied as an output.

2. The data acquisition system of claim 1 wherein the comparison means further comprises a digital filter having a first storage means for storing digital signals representative of the DC offset from the second amplifying means.

3. The data acquisition system of claim 2 wherein the digital filter has a second storage means for storing DC offset from the first amplifying means.

4. The data acquisition system of claim 3 wherein the digital filter further comprises:

e. i. a first subtraction circuit connected to subtract the contents of the first storage means from the digital signal from the analog-to-digital conversion means to provide a first difference signal; and ii. a second subtraction circuit, connected to receive the first difference signal and to subtract the contents of the second storage means from the first differential signal providing an output signal.

5. The data acquisition system of claim 1 wherein the switching means further comprise:

c. i. a timing circuit for providing timing pulses;

ii. a plurality of switches corresponding to the input channels, responsive to the timing circuit; and iii. a shorting circuit, responsive to the timing circuit to close when the switches open to present the reference voltage to the second amplifying means.

6. The data acquisition system of claim 4 wherein the switching means further comprise:

c. i. a timing circuit for providing timing pulses;

ii. a plurality of switches corresponding to the input channels, responsive to the timing circuit; and iii. a shorting circuit, responsive to the timing circuit to close when the switches open to present the reference voltage to the second amplifying means.

7. A method of processing data, in the form of electrical analog signals, acquired from a plurality of input channels comprising the steps of:

a. presenting a reference voltage to the input of a second amplifying means to provide a value of DC offset at the output of the second amplifying means;

b. converting the DC offset to a digital representation;

c. storing the digital DC offset;

d. amplifying the input analog signals through a first amplifier and through the second amplifying means;

e. converting the amplified input signal to digital form; and f. subtracting the digital DC offset from the digital input signal to provide a digital output.

8. The method of claim 7 further comprising the steps of:

g. averaging the output signal from the first amplifier to obtain the DC offset from the first amplifier;

h. digitizing the first amplifier DC offset;

i. storing the first amplifier digital DC offset; and j. subtracting the first amplifier digital DC offset from the first difference to provide an output.

* * * * *